United States Patent
Lee et al.

(10) Patent No.: US 9,258,487 B2
(45) Date of Patent: Feb. 9, 2016

(54) AUTO CALIBRATION METHOD AND OIS CAMERA USING THE SAME

(75) Inventors: Junghyun Lee, Seoul (KR); Seongcheol Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/360,233

(22) PCT Filed: Jul. 9, 2012

(86) PCT No.: PCT/KR2012/005435
§ 371 (c)(1),
(2), (4) Date: May 22, 2014

(87) PCT Pub. No.: WO2013/081268
PCT Pub. Date: Jun. 6, 2013

(65) Prior Publication Data
US 2014/0320678 A1    Oct. 30, 2014

(30) Foreign Application Priority Data
Nov. 29, 2011 (KR) .......................... 10-2011-0125996

(51) Int. Cl.
*H04N 5/232*    (2006.01)
*G02B 27/64*    (2006.01)

(52) U.S. Cl.
CPC ............ *H04N 5/2328* (2013.01); *G02B 27/646* (2013.01); *H04N 5/23254* (2013.01); *H04N 5/23258* (2013.01); *G03B 2217/005* (2013.01)

(58) Field of Classification Search
CPC .......... H04N 5/23254; H04N 5/23258; H04N 5/2328

USPC ...................................................... 348/208.1
See application file for complete search history.

(56) References Cited

U.S. PATENT DOCUMENTS

2009/0314084 A1* 12/2009 Sugibayashi et al. ....... 73/504.16
2010/0123783 A1*  5/2010 Lin .............................. 348/180

FOREIGN PATENT DOCUMENTS

| JP | 10-150595 A | 6/1998 |
| JP | 3402760 B2 | 5/2003 |
| JP | 2008-160277 A | 7/2008 |

(Continued)

OTHER PUBLICATIONS

English translation of JP 2008160277 A Ishige, Yoshiyuki Jul. 2008.*

(Continued)

*Primary Examiner* — James Hannett
(74) *Attorney, Agent, or Firm* — Saliwanchik, Lloyd & Eisenschenk

(57) ABSTRACT

An auto calibration method and an optical image stabilizer (OIS) camera using the same are provided. The auto calibration method includes removing a DC offset of a gyroscope. A vibrator signal applied by operating a vibrator, and an actual measurement value of the gyroscope is obtained using the applied vibrator signal. A first gain value for compensating for sensitivity of the gyroscope is calculated using the vibrator signal and the actual measurement value of the gyroscope, and an actuator is operated. A displacement of a pixel actually moving on an image is moved under an operation of the actuator. A second gain value for controlling a sensitivity variation of the actuator is calculated based on the displacement of the actually moving pixel. Accordingly, it is possible to reduce processing time and to ensure high performance.

13 Claims, 2 Drawing Sheets

(56) References Cited

FOREIGN PATENT DOCUMENTS

JP   2008160277 A  *  7/2008
JP   2009-077021 A    4/2009

OTHER PUBLICATIONS

International Search Report in International Application No. PCT/KR2012/005435, filed Jul. 9, 2012.

* cited by examiner

AUTO CALIBRATION METHOD AND OIS CAMERA USING THE SAME

CROSS-REFERENCE TO RELATED APPLICATIONS

This application is the U.S. national stage application of International Patent Application No. PCT/KR2012/005435, filed Jul. 9, 2012, which claims priority to Korean Application No. 10-2011-0125996, filed Nov. 29, 2011, the disclosures of each of which are incorporated herein by reference in their entirety.

TECHNICAL FIELD

The present invention relates to an auto calibration method and an optical image stabilizer (OIS) camera using the same, and more particularly, to an auto calibration method and an OIS camera using the same, which can overcome a variation level caused in the manufacturing state of a gyroscope and an actuator and obtain reliable performance.

BACKGROUND ART

In an optical image stabilizer (OIS) camera, three components are added to a typical auto focusing (AF) camera. First, the OIS camera includes a gyroscope sensor for sensing tremor. The gyroscope sensor generally has a function of sensing degrees of tilting with respect to two axes (pitch and yaw). Second, the OIS camera includes an actuator for compensating for tilting of the camera when tremor occurs. Third, the OIS camera includes an OIS control large scale integration (LSI) chip for controlling the gyroscope sensor and the actuator.

Among the three components, the gyroscope sensor and the actuator cannot achieve normal performance when the OIS control LSI chip does not correct a variation between products in a manufacturing state. Typically, the OIS control LSI chip necessarily includes a gain amplifying circuit to control the ratio of output to input, and a module manufacturer performs an individual calibration method for each component through the control of the gain amplifying circuit.

To this end, the typical method includes two methods. First, there is a method of manually searching for a gain value so as to provide the same value to all modules. In this case, the processing time can be decreased, but it is difficult to ensure exact OIS performance when the distribution between components is large. Second, there is a method of automatically searching for a gain value through an image test. In the method, although the distribution between components is large, it can be expected to ensure exact OIS performance to some degree. However, the processing time is considerably increased according to gain control resolution, the evaluation method is complicated, and the processing cost is increased.

Therefore, it is difficult to decrease the processing time and to ensure the exact OIS performance using the typical method, and hence it is required to provide a plan capable of solving such problems.

DISCLOSURE OF INVENTION

Technical Problem

The present invention is conceived to solve the aforementioned problems. Accordingly, an object of the present invention is to provide an auto calibration method and an optical image stabilizer (OIS) camera using the same, which can decrease processing time and ensure high performance.

Solution to Problem

According to an aspect of the present invention, there is provided an auto calibration method having a gyroscope for sensing tremor and an actuator for compensating for tilting of a camera when the tremor occurs, the method including: removing a DC offset of the gyroscope; applying a vibrator signal by operating a vibrator, and obtaining an actual measurement value of the gyroscope using the applied vibrator signal; calculating a first gain value for compensating for sensitivity of the gyroscope using the vibrator signal and the actual measurement value of the gyroscope; operating the actuator; measuring a displacement of a pixel actually moving on an image under an operation of the actuator; and calculating a second gain value for controlling a sensitivity variation of the actuator based on the displacement of the actually moving pixel.

The auto calibration method may further include storing the first and second gain values.

The vibrator signal may be a triangular wave signal, and the calculating of the first gain value may include determining, as the first gain value, a value obtained by dividing the scope of the triangular wave signal by the actual measurement value of the gyroscope.

The calculating of the first gain value may include determining, as the first gain value, a value obtained by dividing an average of angular velocity by the actual measurement value of the gyroscope when the vibrator signal does not have the same slope.

The vibrator signal may be a sine wave signal, and the calculating of the first gain value may include determining, as the first gain value, a value obtained by dividing a calculated angular velocity of the sine wave signal by the actual measurement value of the gyroscope.

The calculating of the second gain value may include determining, as the second gain value, a value obtained by dividing a reference coordinate displacement by the displacement of the actually moving pixel.

The auto calibration method may further include storing a signal calibrated by removing the DC offset.

The removing of the DC offset may be performed in a state in which the vibrator is stopped.

The first gain value may be a gain value of an amplifying circuit for compensating for a variation level of sensitivity tolerance of a current gyroscope.

According to another aspect of the present invention, there is provided an optical image stabilizer (OIS) camera, including: a gyroscope configured to sense tremor; an actuator configured to compensate for tilting of the camera when the tremor is sensed by the gyroscope; and a controller configured to perform gain calibration of the camera by calculating a first gain value for compensating for sensitivity of the gyroscope and a second gain value for controlling a sensitivity variation of the actuator.

The controller may obtain an actual measurement value of the gyroscope by generating a signal from a vibrator, and calculate the first gain value for compensating for the sensitivity of the gyroscope using the actual measurement value.

The signal generated from the vibrator may be a triangular wave signal, and the controller may determine, as the first gain value, a value obtained by dividing the scope of the triangular wave signal by the actual measurement value of the gyroscope.

The signal generated from the vibrator may be a sine wave signal, and the controller may determine, as the first gain value, a value obtained by dividing a calculated angular velocity of the sine wave signal by the actual measurement value of the gyroscope.

The controller may measure a displacement of a pixel actually moving on an image under an operation of the actuator, and calculate the second gain value based on the displacement of the actually moving pixel.

The OIS camera may further include a storage configured to store a signal calibrated by removing the DC offset when the DC offset of the gyroscope is removed.

Advantageous Effects of Invention

According to the auto calibration method and an optical image stabilizer (OIS) camera using the same configured as described above, it is possible to decrease processing time and cost and to ensure high performance.

MODE FOR THE INVENTION

Figure 1:
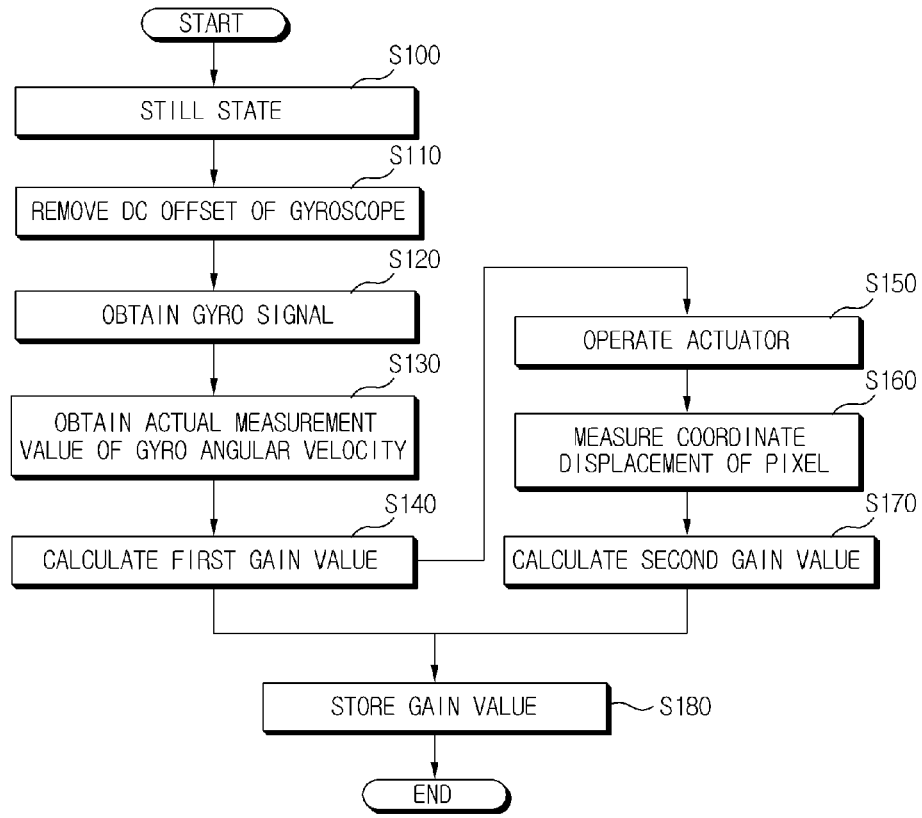
FIG. 1 is a flowchart illustrating an auto calibration method in an optical image stabilizer (OIS) camera according to an embodiment of the present invention.

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

It will be understood that, although the terms "first," "second," etc. may be used herein to describe various elements, these elements should not be limited by these terms. These terms are only used to distinguish one element from another element. Thus, a "first" element discussed below could also be termed as a "second" element without departing from the teachings of the present invention.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise.

It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

In the drawings, the thickness of layers, films and regions are exaggerated for clarity. Like numerals refer to like elements throughout.

FIG. 1 is a flowchart illustrating an auto calibration method in an optical image stabilizer (OIS) camera according to an embodiment of the present invention.

First, the auto calibration method starts in a still state of the camera (S100). That is, a vibrator is necessarily in the still state. In a first step, calibration is performed to a level of zero by removing an offset (S110).

Figure 2:
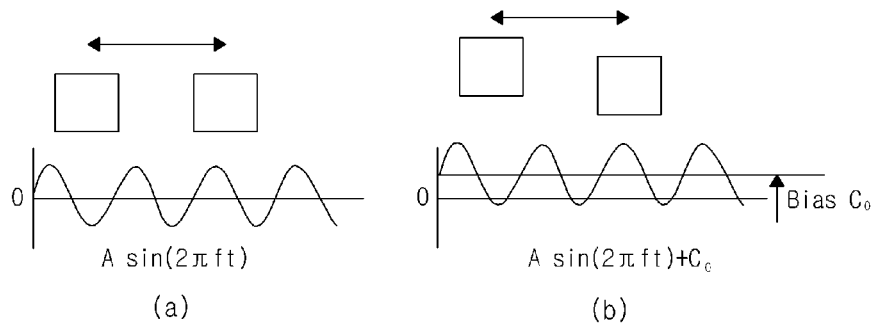
FIG. 2 is a view illustrating a process of removing a DC offset using a gyroscope, in the auto calibration method in the OIS camera according to the embodiment of the present invention.

Step S110 is shown in FIG. 2. FIG. 2(a) shows a signal (sine wave) obtained by a gyroscope when a sine wave is vibrated, and FIG. 2(b) shows a signal in which an offset occurs according to a manufacturing state. That is, when assuming that the signal is a sine wave signal, the signal has an offset of CO according to the manufacturing state. If the signal in this state passes through an integrator of an OIS controller, the value of a gyro signal is accumulated as an error value in proportion to time. Thus, the first step includes a process of removing the offset. The error value may be stored in a storage module, e.g., an electrically erasable programmable read-only memory (EEPROM).

Next, the gyro signal is obtained (S120).

Figure 3:
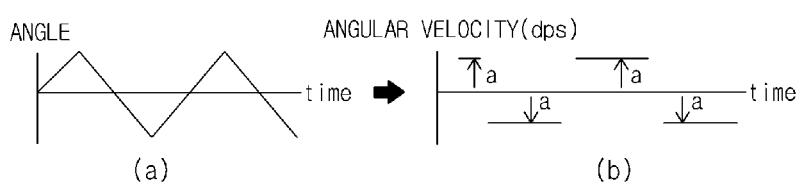
FIG. 3 is a view illustrating a process of obtaining a signal using the gyroscope, in the auto calibration method in the OIS camera according to the embodiment of the present invention.

Step S120 is shown in FIG. 3. First, the vibrator is operated to detect an actual measurement value of the gyro signal. It is sufficient that the vibrator detect only the maximum of angles that can be adjusted by an actuator. Thus, a triangular wave having the same slope is inputted. However, when there is a problem in implementing the triangular wave, a general sine wave signal may also be inputted. Here, the differential value of the same slope is received as an angular velocity (unit: dps (degree per second)) in the gyroscope.

FIG. 3(a) shows a vibrator signal. That is, the vibrator signal having the same slope is applied. FIG. 3(b) shows an angular velocity obtained through the gyroscope based on the input vibrator signal. Since the triangular wave signal having the same slope has been applied, the angular velocity value "a" received by the gyroscope is constant. Thus, the camera including the gyroscope has a characteristic of the actual measurement value "a." If the vibrator does not obtain a signal having the same slope due to a reproduction problem, the average of angular velocity values obtained in a certain time T may be applied to the actual measurement value.

Next, a first gain value is calculated. The first gain value is a value used to determine a gain (dB) level of an amplifying circuit for compensating for a variation level with respect to sensitive tolerance of the gyroscope. The first gain value may be calculated by the following Equation 1.

$$\text{First gain value} = \frac{\text{Slope of triangular wave}}{\text{Actual measurement value of gyroscope}} \qquad [\text{Equation 1}]$$

In Equation 1, the numerator denotes a slope of a triangular wave of the vibrator, which is a reference value. The denominator denotes an actual measurement value in the vibrator, obtained through the process described above. The first gain value is determined by dividing the reference value of the slope by the actual measurement value of the slope.

When assuming that the signal of the vibrator is a sine wave, the reference value of the numerator is not the slope of the triangular wave but is the maximum triangular velocity of the vibrator. The angular velocity of the vibrator is generally expressed by the following Equation 2 using a vibrator angle and a vibrator frequency.

$$\text{Maximum angular velocity of sine wave} = 2\pi \times \text{vibrator frequency} \times \text{vibrator angle} \quad \text{[Equation 2]}$$

If the vibrator has a sine wave of ±0.5/5 hz based on the vibrator angle of zero, the maximum angular velocity (dps) of the sine wave corresponding to the numerator becomes $2*\pi*5$ hz*1 degrees. In this case, the actual measurement value of the gyroscope is also an angular velocity (dps), and thus the first gain value is determined as maximum angular velocity of sine wave/actual measurement value of gyroscope.

The first gain value is stored in the storage module, e.g., EEPROM, etc. (S180). The first gain value is used to compensate for the gyro sensitivity of a current module.

The next step illustrates a process of calculating a second gain value.

First, an actuator is operated (S150). The current value for operating the actuator is identical to that determined by the reference value in step S170 which will be described later.

Figure 4:
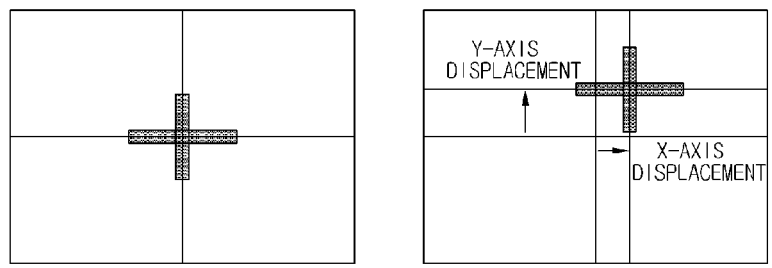
FIG. 4 is a view illustrating a process of measuring a coordinate displacement of a pixel, in the auto calibration method in the OIS camera according to the embodiment of the present invention.

If the actuator is operated, the coordinate displacement of a pixel is measured (S160). Step S160 is shown in FIG. 4. That is, the Y-axis and X-axis displacements of the pixel actually moving on an image are measured by the operation of the actuator. In this case, the displacement of the pixel is a displacement including the tolerance of an effective focal length (EFL) of the current module.

The reason why the displacement of the actuator is considered as the displacement of the pixel is that correction is performed including even a variation that may be generated by the tolerance of the EFL of the camera. Since the pitch of a sensor pixel is constant, the displacement of an actual stroke is not applied to the displacement of the pixel.

The displacement of the pixel may be calculated by the following Equation 3.

$$\text{Displacement of pixel} = \frac{\text{Stroke of actuator}}{\text{Pixel pitch of image sensor}} \quad \text{[Equation 3]}$$

Here, the stroke of the actuator denotes a value obtained by multiplying EFL (effective focal length) and TAN (correction angle).

The second gain value is calculated based on the displacement of the pixel, calculated as described above (S170). The displacement of the pixel is calculated by respectively measuring displacements of x and y coordinates. The displacements are used as actually measured displacements by the following Equation 4.

$$\text{Second gain value} = \frac{\text{Reference coordinate displacement}}{\text{Actually measured displacement}} \quad \text{[Equation 4]}$$

Here, the reference coordinate displacement is an arbitrary value. An arbitrary current value is determined as many as a correctable angle, in consideration of the level of current application to actual stroke, possessed by the actuator.

Finally, the calculated second gain value is stored in the storage module (S180). That is, the second gain value is stored in storage such as EEPROM to use the calibration of sensitivity variation.

The auto calibration method in the OIS camera according to the embodiment of the present invention is divided into two processes, i.e., a gyro sensitivity calibration process and an actuator sensitivity calibration process. The auto calibration method is identically performed on both the pitch and yaw axes. Accordingly, the variation level caused in the manufacturing states of the gyroscope and the actuator is overcome, so that it is possible to ensure the performance of the camera as much as possible, to exactly apply the variation level to the camera and to perform the processes at low cost for a short period of time.

Figure 5:
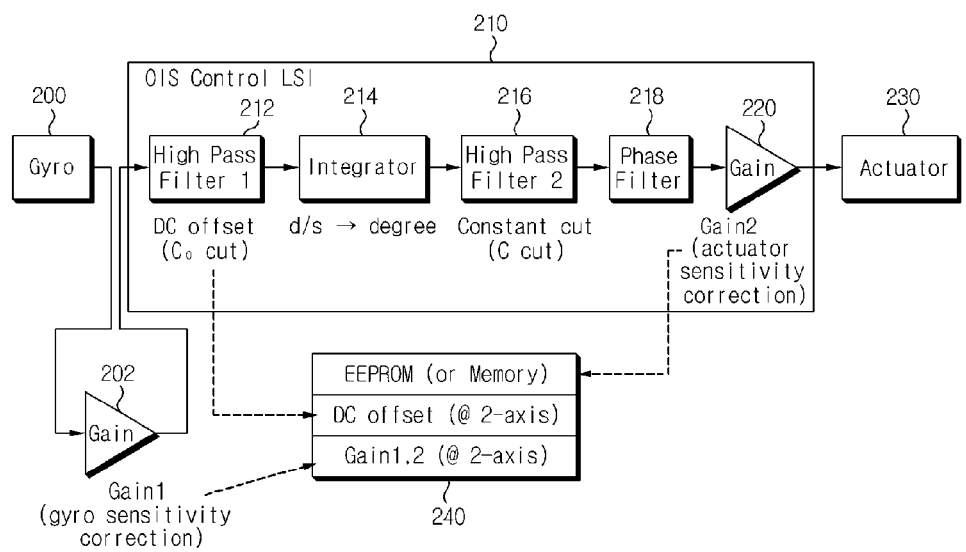
FIG. 5 is a block diagram illustrating an operation of an OIS camera to which the auto calibration method is applied according to an embodiment of the present invention.

FIG. 5 is a block diagram illustrating an operation of an OIS camera to which the auto calibration method is applied according to an embodiment of the present invention.

As shown in FIG. 5, the OIS camera according to the embodiment of the present invention includes a gyroscope 200, an actuator 230, a controller 210 and a storage 240.

First and second gain values 202 and 220 are obtained as described in the afore-mentioned method. Therefore, the detailed description of the method will be omitted. The first gain value 202 passes through the controller 210 so that the second gain value 220 is derived, and the second gain value 220 is used to calibrate sensitivity of the actuator 230. Specifically, the first gain value 202 passes through a first high pass filter 212, an integrator 214, a second high pass filter 216 and a phase filter 218 in the controller 210.

Meanwhile, the first and second gain values 202 and 220 may be stored in the storage 240. In the conventional method, only the second gain value is calibrated using a calibration method through image processing or manual calibration method. That is, the second gain value is corrected after a gyro signal passes through the intergrator and changes into an angle and before determining a value to be transferred to the actuator. However, in the OIS camera according to the embodiment of the present invention, the sensitivity compensation of the gyroscope is distinguished from that of the actuator, so that two types of values such as the first and second gain values 202 and 220 are stored in the storage 240.

Accordingly, it is possible to remarkably reduce processing time and to perform correction by exactly applying individual vibrations, and thus the performance of the OIS camera can be ensure. Further, the automation is possible using the method of the present invention, so that mass production is possible, thereby reducing production cost.

Although the present invention has been explained by the embodiments shown in the drawings described above, it should be understood to the ordinary skilled person in the art that the present invention is not limited to the embodiments but rather that various changes or modifications thereof are possible without departing from the spirit of the present invention. Accordingly, the scope of the present invention shall be determined only by the appended claims and their equivalents.

The invention claimed is:

1. An auto calibration method having a gyroscope for sensing tremor and an actuator for compensating for tilting of a camera when the tremor occurs, the method comprising:
    removing a DC offset of the gyroscope;
    applying a vibrator signal by operating a vibrator, and obtaining an actual measurement value of the gyroscope using the applied vibrator signal;

calculating a first gain value for compensating for sensitivity of the gyroscope using the vibrator signal and the actual measurement value of the gyroscope;

operating the actuator;

measuring a displacement of a pixel actually moving on an image under an operation of the actuator; and calculating a second gain value for controlling a sensitivity variation of the actuator based on the displacement of the actually moving pixel, wherein the calculating of the second gain value includes determining the second gain value by dividing a reference coordinate displacement by the displacement of the actually moving pixel.

2. The method of claim 1, further comprising storing the first and second gain values.

3. The method of claim 1, wherein the vibrator signal is a triangular wave signal, and the calculating of the first gain value includes determining the first gain value by dividing a scope value of the triangular wave signal by the actual measurement value of the gyroscope.

4. The method of claim 3, wherein the calculating of the first gain value includes determining the first gain value by dividing an average value of angular velocity by the actual measurement value of the gyroscope when the vibrator does not output the signal having constant slope.

5. The method of claim 1, wherein the vibrator signal is a sine wave signal, and the calculating of the first gain value includes determining the first gain value by dividing a calculated angular velocity of the sine wave signal by the actual measurement value of the gyroscope.

6. The method of claim 1, further comprising storing a signal calibrated by removing the DC offset.

7. The method of claim 6, wherein the removing of the DC offset is performed in a state in which the vibrator is stopped.

8. The method of claim 1, wherein the first gain value is a gain value of an amplifying circuit for compensating for a variation level of sensitivity tolerance of the gyroscope.

9. An optical image stabilizer (OIS) camera, comprising:
a gyroscope configured to sense tremor;
an actuator configured to compensate for tilting of the camera when the tremor is sensed by the gyroscope; and
a controller configured to;
    perform gain calibration of the camera by calculating a first gain value for compensating for sensitivity of the gyroscope and a second gain value for controlling a sensitivity variation of the actuator;
    measure a displacement of a pixel actually moving on an image under an operation of the actuator; and
    calculate the second gain value by dividing a reference coordinate displacement by the displacement of the actually moving pixel.

10. The OIS camera of claim 9, wherein the controller obtains an actual measurement value of the gyroscope by generating a signal from a vibrator, and calculates the first gain value for compensating for the sensitivity of the gyroscope using the actual measurement value.

11. The OIS camera of claim 10, wherein the signal generated from the vibrator is a triangular wave signal, and the controller is configured to determine the first gain value by dividing a scope value of the triangular wave signal by the actual measurement value of the gyroscope.

12. The OIS camera of claim 10, wherein the signal generated from the vibrator is a sine wave signal, and the controller is configured to determine the first gain value by dividing a calculated angular velocity of the sine wave signal by the actual measurement value of the gyroscope.

13. The OIS camera of claim 9, further comprising a storage configured to store a signal calibrated by removing the DC offset when the DC offset of the gyroscope is removed.

* * * * *